Figure 1:
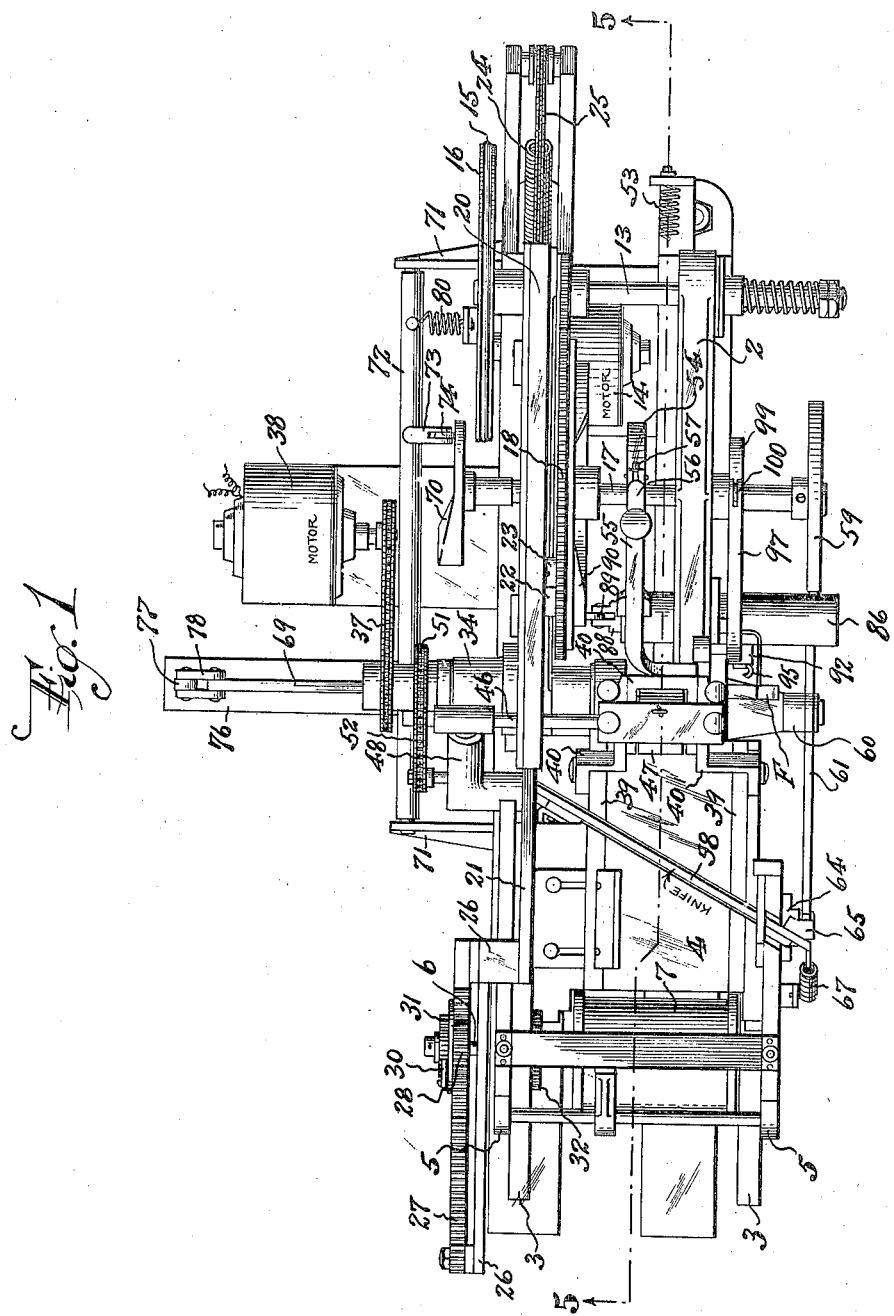

June 1, 1926.

E. P. DONNELLAN 1,586,977

MACHINE FOR MAKING TUBULAR WRAPPERS FOR COINS, ETC

Filed Feb. 11, 1925

8 Sheets-Sheet 1

INVENTOR.
Edward P. Donnellan,
BY
Fraentzel and Richards
ATTORNEYS.

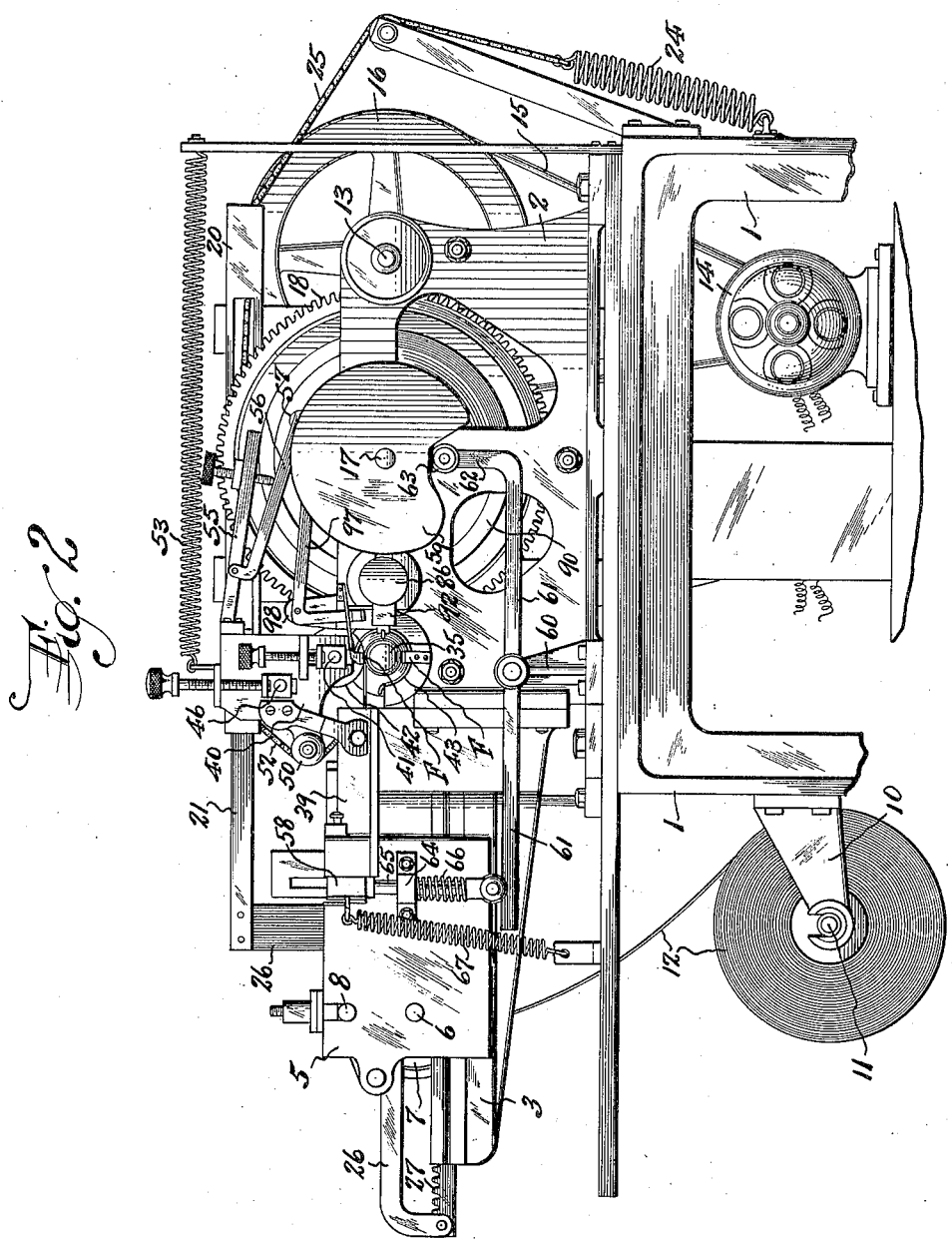

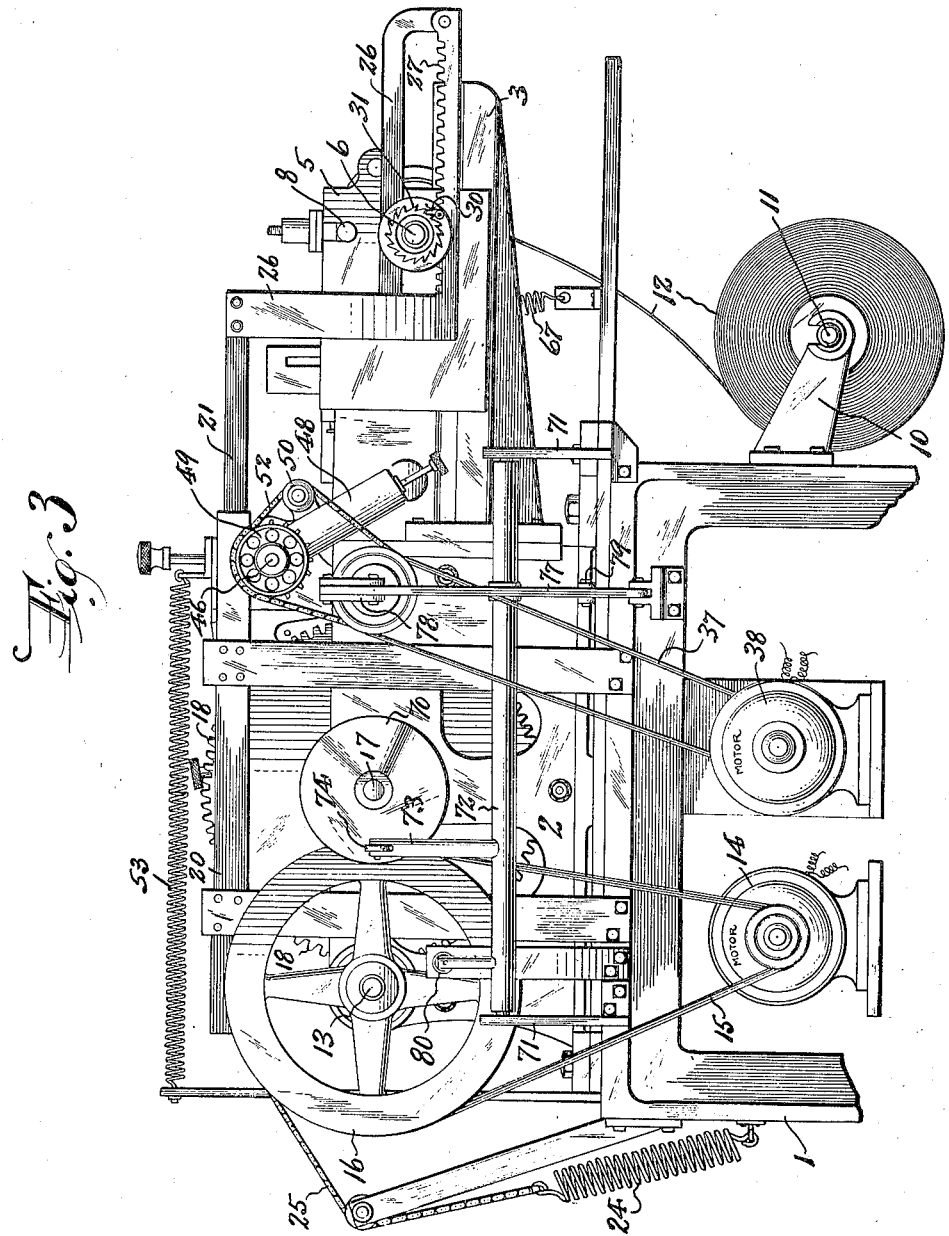

June 1, 1926.  
E. P. DONNELLAN  
1,586,977  
MACHINE FOR MAKING TUBULAR WRAPPERS FOR COINS, ETC  
Filed Feb. 11, 1925  
8 Sheets-Sheet 4
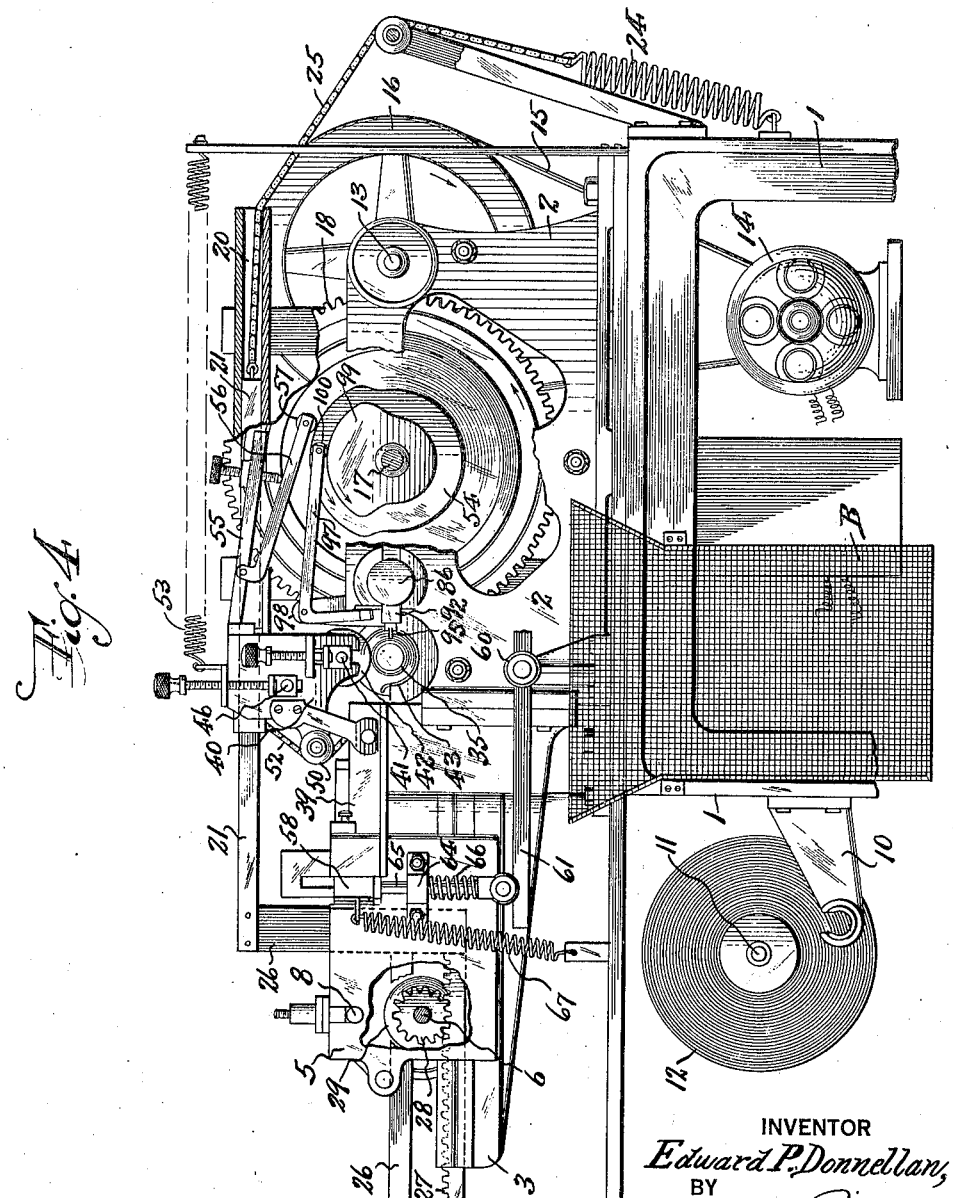
INVENTOR  
Edward P. Donnellan,  
BY  
ATTORNEYS

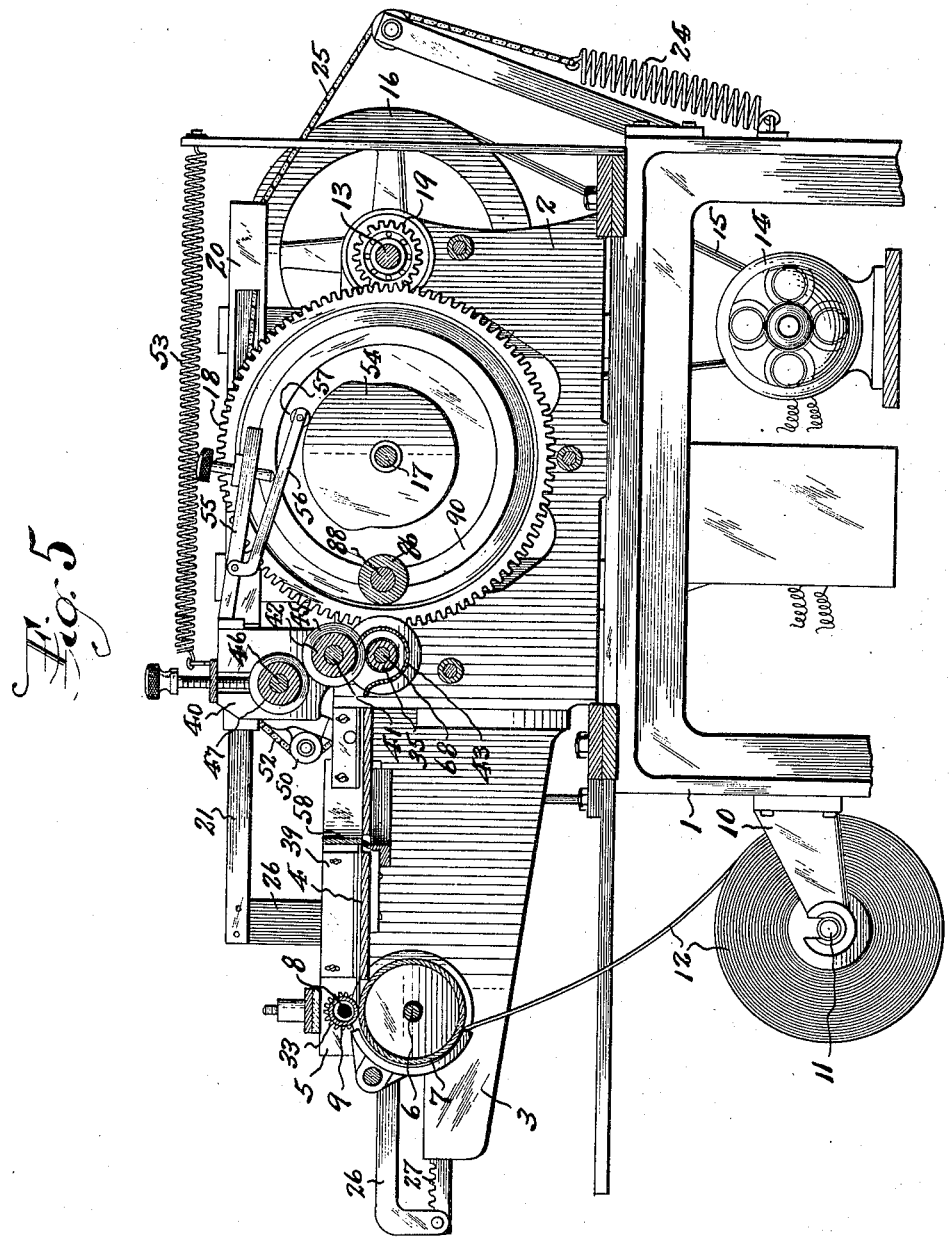

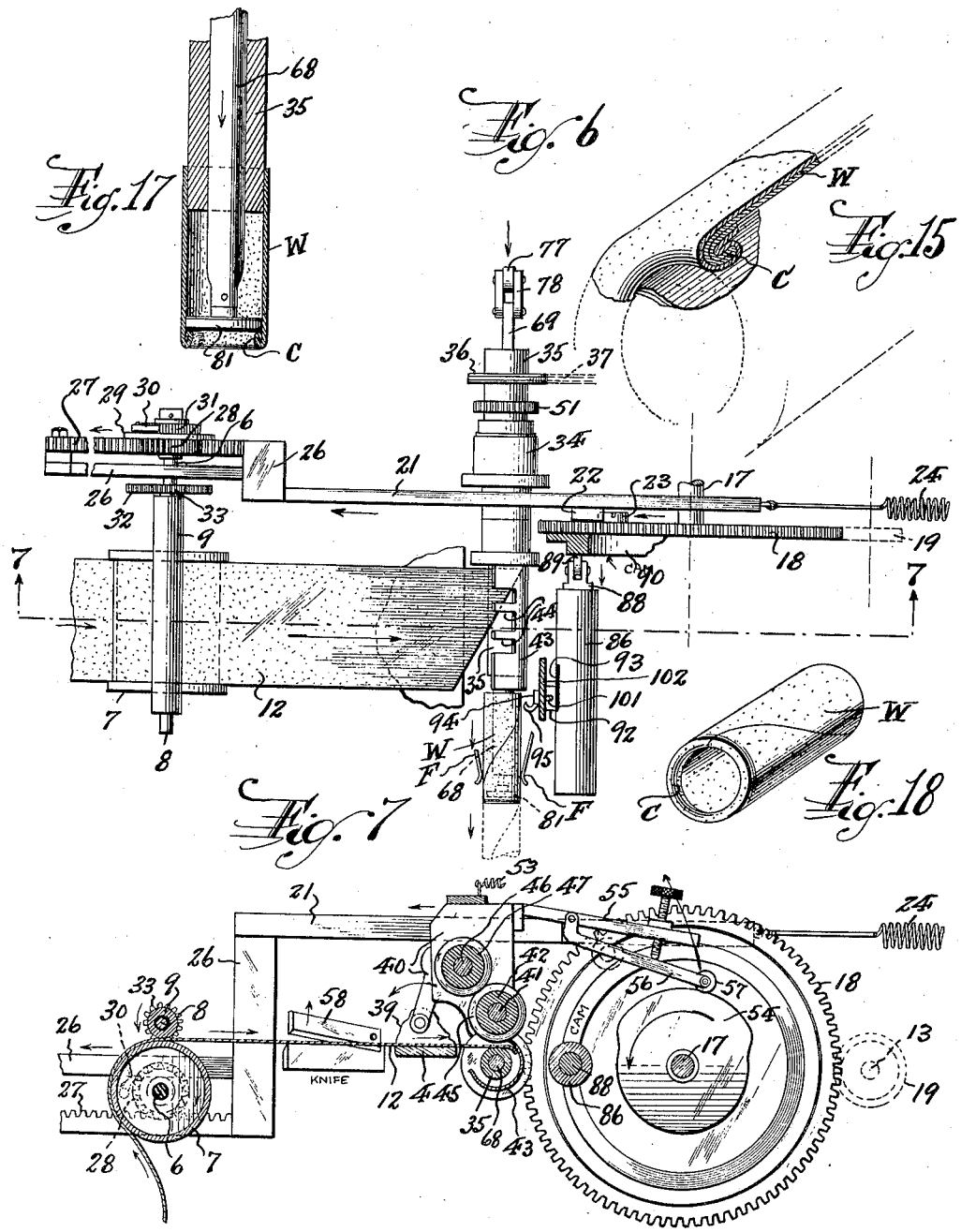

June 1, 1926.
E. P. DONNELLAN
MACHINE FOR MAKING TUBULAR WRAPPERS FOR COINS, ETC
Filed Feb. 11, 1925
1,586,977
8 Sheets-Sheet 7
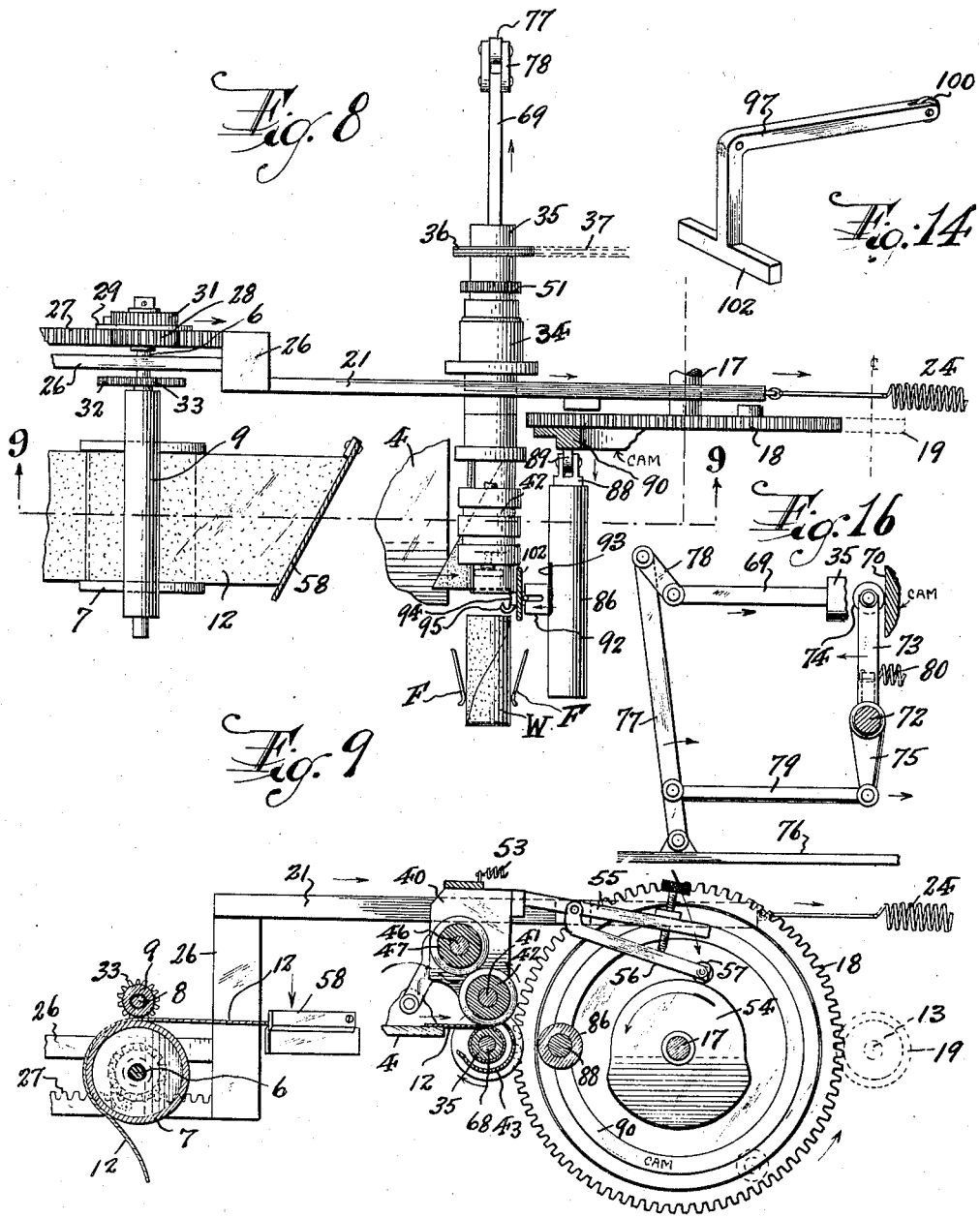
INVENTOR.
Edward P. Donnellan,
BY
Fraentzel and Richards
ATTORNEYS.

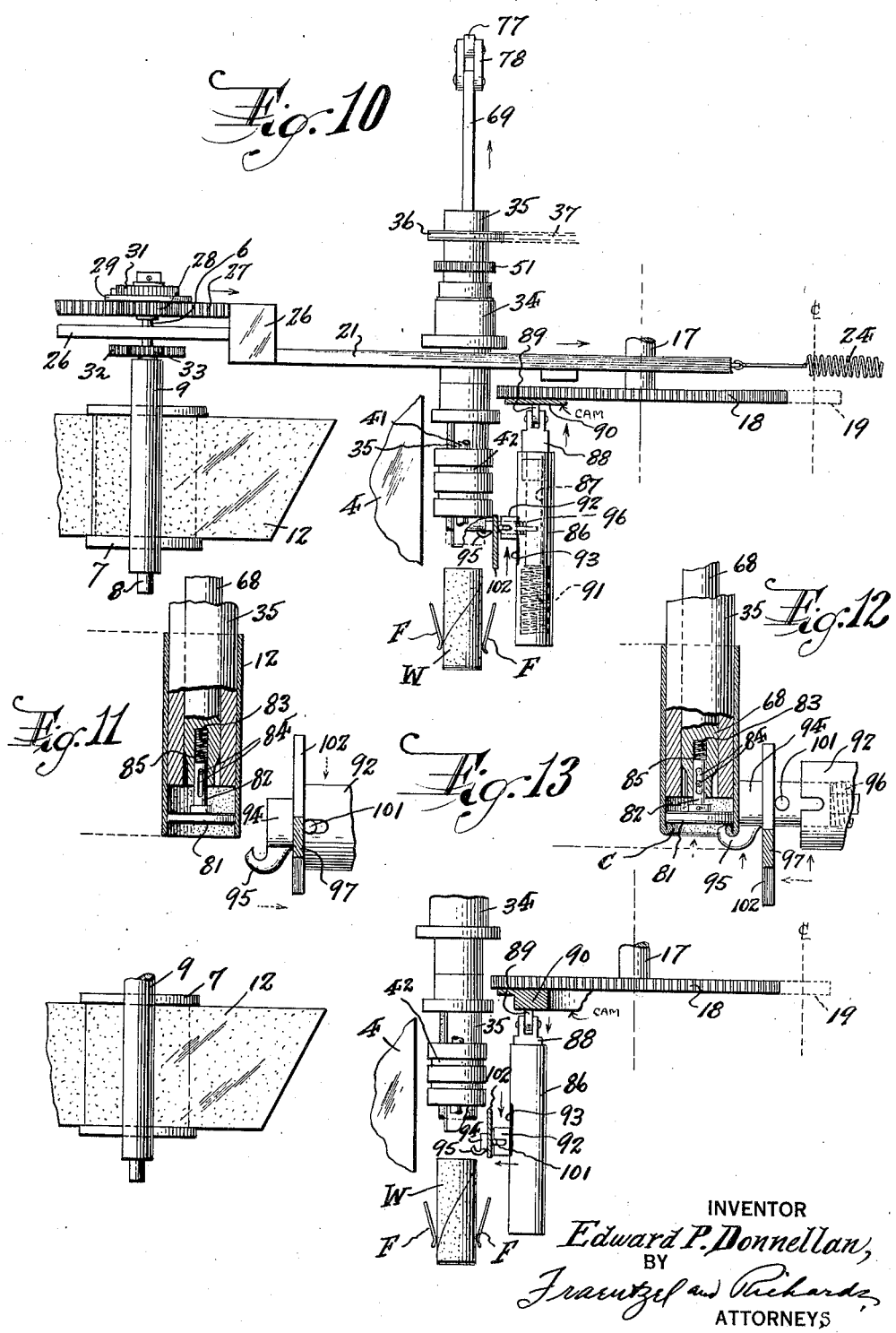

Patented June 1, 1926.

1,586,977

UNITED STATES PATENT OFFICE.

EDWARD P. DONNELLAN, OF BROOKLYN, NEW YORK, ASSIGNOR TO STANDARD-JOHNSON COMPANY, INC., OF BROOKLYN, NEW YORK, A CORPORATION OF NEW YORK.

MACHINE FOR MAKING TUBULAR WRAPPERS FOR COINS, ETC.

Application filed February 11, 1925. Serial No. 8,387.

This invention relates, generally, to improvements in machines for making tubular wrappers for coins and other articles; and the invention has reference, more particularly, to a novel automatic machine for preforming hollow cylindrical or tubular wrappers from paper or similar web material, suitable for enclosing coins or other articles.

The invention has for its principal object to provide a simple, rapid and efficient automatic mechanism adapted to feed sheet paper, or like web-material, from a roll thereof, and by successive operations divide the same into suitable lengths, then form each length into a hollow cylindrical or tubular body having one end crimped or curled to form an internal annular coin abutment or stop, and finally to eject the body thus formed from the machine ready for use.

Other objects of this invention, not at this time more particularly enumerated, will be clearly understood from the following detailed description of the same.

With the objects of this invention in view, the same consists, primarily, in the novel automatic machine for making tubular wrappers for coins and other articles; and, the invention consists, furthermore, in the novel arrangements and combinations of the various devices and parts, as well as in the details of the construction of the said parts, all of which will be hereinafter more fully described in the following specification, and then finally embodied in the claims appended thereto.

The invention is clearly illustrated in the accompanying drawings, in which:—

Figure 1 is a plan view of the complete machine, made according to and embodying the principles of this invention; Figure 2 is a side elevation of the same; Figure 3 is an opposite side elevation of the same; Figure 4 is a side elevation similar to that shown in Figure 2, but with parts broken away to show interior mechanism; Figure 5 is a longitudinal vertical section, taken on line 5—5 in Figure 1; Figure 6 is a detail fragmentary plan view of certain parts of the paper feeding and forming mechanism showing an initial stage of the operations thereof; Figure 7 is a vertical longitudinal section taken on line 7—7 in said Figure 6; Figure 8 is a view similar to that shown in said Figure 6, but illustrating a further advanced stage of the paper feeding and forming operations; Figure 9 is a vertical longitudinal section taken on line 9—9 in said Figure 8; Figure 10 is another view similar to that shown in Figures 6 and 8, but illustrating a still further advanced stage of the paper feeding and forming operations; Figure 11 is an enlarged fragmentary horizontal sectional view showing the position of the mechanism prior to the operation of crimping or curling one end of the tubular paper formation; Figure 12 is a view similar to Figure 11, but showing the performance of the said crimping or curling operations; Figure 13 is a fragmentary view similar to that shown in Figure 6, but showing the completion of the paper forming operations; Figure 14 is a detail enlarged perspective of a lever which controls the positioning of the paper crimping or curling device; Figure 15 is an enlarged fragmentary perspective, showing the results of the paper crimping or curling operation; Figure 16 is a fragmentary view illustrating the means for actuating the ejector mechanism for delivering the completed tubular wrapper out of the machine; Figure 17 is an enlarged detail section of the wrapper ejector in operation; and Figure 18 is a perspective view of the completed tubular wrapper as produced by my novel machine.

Similar characters of reference are employed in all of the hereinabove described views, to indicate corresponding parts.

Referring now to said drawings, the reference character 1 indicates a suitable bed-frame upon which is mounted the mechanism comprising the novel wrapper making machine. Supported by said bed-frame 1 are a pair of laterally spaced apart side-frames 2, in connection with which are rearward extensions or brackets 3. Suitably secured in horizontal extension between said brackets 3 is a supporting plate or table 4. Longitudinally adjustable on said brackets 3 are bearing plates 5. Journaled in said bearing plates 5, so as to extend transversely therebetween, is a feed-roll shaft 6 upon which is secured one of a pair of feed rolls, viz, the feed-roll 7. Also journaled in said bearing plates 5 is a second feed-roll shaft 8 upon which is secured the second feed-roll 9, which is thus mounted above the feed-roll 7 to run tangent thereto. Said feed-rolls 7 and 9 are located adjacent to the rearward end of the supporting plate or table 4. Mounted on supporting brackets 10, which are provided in connection with the rear end of said bed-frame 1, is a mandrel or shaft 11 upon which is rotatably supported a roll of paper 12, which is supplied to the machine by the operation of said feed-rolls 7 and 9; and to this end the free or leading end of the paper 12 extends upwardly to and over the feed-roll 7, and between the latter and said feed-roll 9. The feed-rolls 7 and 9 are intermittently actuated to successively feed forward suitable lengths of paper to be operated upon by the wrapper forming mechanisms.

The means for intermittently driving said paper feed-rolls 7 and 9 comprises, a suitable transmission mechanism which is operated from a main drive shaft 13. Said main drive shaft 13 is journaled in and extends transversely between said side-frames 2, and is itself driven from an electric motor 14, or any other suitable source of power, by means of a belt 15 which rotates a pulley 16 secured upon said drive shaft 13. Also journaled in and extending transversely between said side-frames 2 is a driven shaft 17 upon which is fixed a gear-wheel 18, which meshes with and is driven by a spur-gear 19 fixed on said drive shaft 13. Supported in connection with one of said side-frames 2 is a longitudinal raceway or guide 20. Slidably mounted in said raceway or guide 20, so as to reciprocate therein, is a slide-bar 21. Fixed on the outer side of said slide-bar 21 is a boss or lug 22, and secured on the adjacent face of said gear-wheel 18 is a drive-stud 23. As the gear-wheel 18 is rotated the drive-stud 23 is carried around, whereby at one period in each cycle of rotation, the same engages the boss or lug 22 to thrust the slide-bar 21 forward. Continued rotation of the gear-wheel carries the drive-stud 23 away from the boss or lug 22 upon completion of the forward stroke of said slide-bar 21, whereupon the latter is retracted, by means of a pull-spring 24, or equivalent means, which is connected with the rear end of said slide-bar 21 by a flexible connection, such e. g. as the chain 25. Connected with the free end of said slide-bar 21, by suitable bracket-extensions 26, is a rack 27 adapted to be reciprocated by the operative movements of said slide-bar. Freely rotatable on the end of said feed-roll shaft 6, which is adjacent to said rack 27, is a gear or pinion 28, which in turn rotates a pawl plate 29 upon which is pivotally connected a spring-pressed pawl 30. Fixed on said end of the feed-roll shaft 6 is a ratchet wheel 31 engageable by said pawl 30. As the rack 27 is moved forward the pinion 28 is rotated to in turn rotate the pawl plate 29 and its pawl 30 in operative direction, whereby the latter engages the ratchet wheel 31 and imparts a rotative movement thereto, which is in turn transmitted through the feed-roll shaft 6 to produce a paper feeding rotation of the feed-roll 7. Upon retraction of the slide-bar 21 and the rack 27, the rotation of the pinion 28 and pawl plate 29 is reversed, so that the pawl 30 rides rearwardly over the ratchet wheel 31, the latter and consequently the feed-roll shaft 6 and feed-roll 7 not partaking of such reverse movement, thus permitting said feed-rolls 7 and 9 to dwell immovable for a requisite period of time. The feed-roll shaft 8 is actuated from the feed-roll shaft 6 by mutually intermeshing gears 32 and 33 with which said shafts are respectively provided, and consequently said feed-roll 9 is actuated in company with said feed-roll 6 to intermittently feed forward the paper 12 passed between and gripped by the cooperating feed-rolls 7 and 9. The intergeared relation of the feed-rolls 7 and 9 is such that their surface speeds are substantially equal.

Journaled in a suitable bearing means 34, supported in connection with one of said side-frames 2, is a rotary mandrel 35, which is disposed opposite the forward or inner end of the supporting plate or table 4. The outer or rearward end of said mandrel 35 is provided with a pulley 36, or equivalent driving means, over which runs a drive belt or chain 37, driven by an electric motor 38, or from any other suitable source of power, so that said mandrel is continuously rotated.

Cooperating with said supporting plate or table 4, intermediate the feed-rolls 7 and 9 and said mandrel 35, are side-guide plates 39. Pivotally connected with the inner or forward ends of said side-guide plates 39 is a vertically swinging bearing frame 40, in which is journaled the shaft 41 of a winding roll 42, which cooperates with the mandrel 35 to cause the paper 12 to be wound around the mandrel. The mandrel 35 is surrounded by a suitable paper guide member 43, which is concentric to said mandrel, and which is open to the reception or movement of paper traversing the supporting plate or table into engagement with the mandrel. Said paper guide member 43 is provided with a plurality of slots or openings 44 at its upper side, and said winding roll 42 is provided with a plurality of annular gripping ribs 45 which extend through said slots or openings 44 of the paper guide member 43 into operative engagement with the mandrel 35, so that paper fed to the latter is gripped between said gripping ribs 45 and the surface of the mandrel, to thus propel the paper onward and cause the same to wind itself around the mandrel. Also journaled in said swinging bearing frame 40 is a driven shaft 46 upon which is fixed a friction-driver roll 47. Said driver roll 47 frictionally engages the circumference of the winding roll 42, so that the rotation of the former is thereby transmitted to the latter. Said driven shaft 46 is extended outwardly, through a pivoted and yieldable bearing support 48, and is provided with a sprocket wheel 49. Said bearing support 48 is also provided with an idler wheel 50. Fixed on said mandrel 35 is a driving sprocket 51. A drive chain 52 runs over said driving sprocket 51, sprocket wheel 49 and idler sprocket 50, so that the shaft 46 and driver roll 47 is rotated or driven from the rotary mandrel. The pivoted and yieldable bearing support 48 operates to automatically maintain a proper driving tension as to said drive chain 52 during the swinging movements or oscillations of the vertically swinging bearing frame 40. Said swinging bearing frame 40 is normally maintained in downwardly swung position, to operatively relate the winding roll 42 to the mandrel 35, by a suitably anchored pull-spring 53, or equivalent means, but is subject to an upward swinging movement for the purpose of separating said winding roll 42 from the mandrel 35, so that the paper feed mechanism may cause the insertion of the leading end of a length of paper intermediate said mandrel 35 and said winding roll 42. A means for producing properly timed upward swinging movement of said bearing frame 40 and winding roll 42 is provided. This means consists in a cam-member 54, which is fixed upon said shaft 17. Extending from said swinging bearing frame 40 is an arm 55 provided with an adjustable free end portion 56, which is adapted to be engaged by the periphery of said cam-member 54. If desired, the free end of said end portion 56, may be provided with a roller 57, to reduce friction between the end portion and said cam-member. The rotation of the cam-member 54 will, at proper times, exert a lifting action upon the arm 55, to in turn swing upward the bearing frame 40, and thus separate said winding roll 42 from said mandrel 35 for the insertion of the leading end of a section of paper therebetween.

After the leading end of the paper 12 has been introduced between the mandrel 35 and winding roll 42, a means is provided to sever from the free end portion of said paper 12, a section or length thereof suitable to be operated upon by the mandrel 35 and winding roll 42 to form the desired tubular wrapper. To this end there is provided, in association with the supporting plate or table 4, and at a point intermediate the paper feed rolls and the mandrel, but spaced rearwardly from the latter in accordance with the length of severed paper section it is desired to obtain, a cutting blade or knife 58. This cutting blade or knife 58 is pivoted at one end so as to swing in a vertical plane, and also the same is disposed to extend diagonally across the supporting plate or table 4, to thus produce a diagonal or bias severing cut across the paper. A means is provided for producing a properly timed vertical reciprocation of the knife or cutting blade 58. This means is subject to considerable variation in form and arrangement, but as illustrative of one form which operates satisfactorily, I have shown the following mechanism. Secured to the shaft 17 is a rotary cam member 59. Fulcrumed in connection with a suitable support, as 60, is a lever 61, which is provided at one end with an upturned end-portion 62 adapted to be engaged by the operative periphery of said cam member 59. If desired, the free end of said end-portion 62 may be provided with a roller 63 to reduce friction between said end-portion and said cam-member. Slidable in a guide bracket 64, is a plunger or push-rod 65, the lower end of which is operatively engaged by the opposite or free end of said lever 61, and the upper end of which engages the free end portion of said cutting-blade or knife 58. The said plunger or push-rod 65 is actuated by a compression spring 66 to normally thrust downwardly upon the free end of said lever 61, thereby normally thrusting upward the other end thereof to maintain the latter in operative engagement with the cam member 59. Said cam member 59 is provided in its periphery with an indentation. When the lever 61 is engaged by the normal circumference of the cam member 59, the former is maintained in a normal initial position in which its free end is raised, to thereby raise the plunger or push-rod 65 against the tension of the spring 66, and thereby serving to hold the knife or cutting-blade 58 upwardly swung, against the tension of a pull spring 67 which is connected with the outer free end of the latter. Upon rotation of the cam member 59, the indentation thereof moved into opposition to the upturned end of said lever 61, whereupon under the tension of the spring 66, the push-rod or plunger 65 thrusts and swings downwardly the free end of said lever 61 as the upturned portion 62 moves or drops into said cam indentation, thus permitting the pull spring 67 to swing downwardly the cutting-blade or knife 58, to thus produce the properly timed cutting stroke of the latter. These operations will be understood from an inspection of Figures 1 and 2 of the accompanying drawings.

Axially and slidably related to said mandrel 35 is an ejector rod 68, having an exteriorly and rearwardly projecting tail-piece 69. A transmission means for producing suitably timed reciprocations of said ejector rod 68 is provided. This transmission means comprises, for example, a rotary cam element 70, which is affixed to and rotated by the shaft 17. Journaled in bearing extensions 71, which are affixed to and which project from the frame work of the machine, is a longitudinal rock-shaft 72, which is offset adjacent to said cam element 70. Secured to said rock-shaft 72 is an upwardly extending lever-arm 73, which is adapted to be engaged by the operative face of said cam element 70. If desired, the free end of said lever-arm 73 may be provided with a roller 74 to reduce friction between said lever arm 73 and said cam element 70. Also secured to said rock-shaft 72 is a downwardly extending lever arm 75. Pivotally connected by its lower end to a supporting plate 76, which is affixed to and which extends from the frame work of the machine, is lever 77, the upper free end of which is operatively connected with the tail-piece 69 of said ejector rod 68 by links 78. Interconnected between the free end of said lever arm 75 of the rock-shaft 72 and said lever 77 is a link member or connecting-rod 79. The rock-shaft 72 is held under a rotatable tension, adapted to maintain its lever-arm 73 in operative engagement with the cam element 70, by means of a pull spring 80 or equivalent means.

Connected with the free end of said ejector rod 68, at the free end of said mandrel 35, is a yieldable head, comprising a head-disk 81, corresponding in diameter to the diameter of said mandrel 35. Said head-disk 81 is provided with a stem 82 which is telescopically received in a socket or guide-way 83 in said ejector-rod 68, and which is coupled to the latter for a limited longitudinal movement relative to said ejector-rod by a pin and slot connection 84, or any other equivalent means. Said stem 82 and the head-disk 81 is normally and yieldably maintained in outwardly moved relation to the end of said ejector-rod and the end of said mandrel 35 by means of a compression spring 85 interposed between the bottom of said socket or guideway 83 and the inner end of said stem 82, as shown, more particularly, in Figures 11 and 12 of the accompanying drawings.

Arranged to cooperate with the mandrel 35 is a means for automatically crimping one end of the cylindrical tubular paper body formed by winding a suitable section of paper 12 upon the said mandrel 35. This crimping mechanism comprises a laterally disposed barrel 86, which is suitably supported in connection with one of the side-frames 2, adjacent and parallel to the mandrel 35. Said barrel 86 is provided with an internal bore 87 extending longitudinally inward from its inner end, said bore 87 being closed at the opposite or outer end of said barrel 86. Longitudinally movable in the bore 87 of said barrel 86 is a plunger 88, provided on its exteriorly projected end with an anti-friction roller 89. Mounted on the inner face of said gear wheel 18, which is driven by the shaft 17, or otherwise operatively rotated by the latter, is a cam element 90, the operative face of which is engaged by the anti-friction roller 89 of said plunger 88. Said plunger 88 is yieldably and operatively thrust toward said cam element 90 by means of a compression spring 91, which is interposed between the closed end of said barrel 86 and the inner end of said plunger 88, which plunger 88 is provided with a laterally projecting socket-arm 92, which extends outwardly, through a longitudinal slot or way 93 formed in the side of said barrel 86, toward the position of said mandrel 35. Slidably mounted in said socket-arm 92 is a crimper-member 94, which is provided at its outer free end with a curved crimper-finger 95. Said crimper-member is spring-pressed toward the position of the mandrel 35 by a compression spring 96 mounted in said socket-arm behind said crimper-member. Said crimper-member 94 is normally maintained in a retracted position against the tension of said compression spring 96, but is released, at proper time, for forward movement into operative position and relation to the paper wound upon said mandrel 35. The means for thus controlling the movement of said crimper-member comprises, in one form as shown in the drawings, a bell-crank lever 97 which is pivotally mounted on a fulcrum lug 98 affixed to one of said side-frames 2. Properly timed oscillation of said bell-crank lever 97 is produced by means of a rotatable cam-member 99, which is mounted upon and driven by said shaft 17. The upper arm of said bell-crank lever 97 is operatively engaged by the periphery of said cam-member 99, and in order to reduce friction, the extremity of said upper arm of the bell-crank lever may be provided with an antifriction roller 100. Fixed on said crimper-member is an upwardly projecting stud 101. The lower arm of said bell-crank lever 97 is provided, at its extremity, with a T-head or cross-bar 102, which engages said crimper-member stud 101. The high part of the cam-member 99 actuates the bell-crank lever 97 to swing the lower arm thereof in a direction adapted to press against the stud 101, and thus retract the crimper-member against the tension of the compression spring 96 to a normal initial or inoperative position. The low part of the cam-member 99 permits the bell-crank lever 97 to swing in an opposite direction, to release the restraint of the lower arm thereof upon the stud 101, whereby the compression spring 96 is permitted to thrust outwardly the crimper-member to project its crimper-finger into position for operative movement against the end of the paper wound upon the mandrel 35.

Having thus described the construction of my novel tubular wrapper making machine, the operation of the same is, briefly, as follows:

The web of paper 12 is intermittently fed forward upon the table 4, beneath the normally raised cutting blade or knife 58, with its free end moving toward the mandrel 35. While the leading or free end of the web of paper is approaching the mandrel 35, the timed operation of the cam member 54 is such that it actuates or lifts the lever 55, thus swinging upward the bearing frame 40, and thereby separating the winding roll 42 from the mandrel 35, so that continued movement of the web of paper 12 will carry its leading or free end between said mandrel 35 and winding roll 42. The intermittent paper feed mechanism is so timed, in its operation, that as soon as the leading or free end of the paper 12 is entered between the mandrel 35 and winding roll 42, the motion of the feed rolls 7 and 9 is stopped. While the paper is held stationary, by the stopping of the feed rolls 7 and 9, and before the winding roll is dropped to operative relation to the mandrel 35, the timed movement of the cam member 59, which controls the operation of the cutting blade or knife 58, will cause the actuation of the lever mechanism 61 and plunger 65 to release the cutting blade or knife 58, subject to a downward cutting stroke under the pull of the spring 67, whereupon a length of paper, sufficient for the production of a wrapper, is severed from the web of paper. After a section of paper has thus been severed from the main supply or web of paper, the point in the rotation of the cam member 54 is reached, wherein the lever 55 is released from its lifted position, and consequently the spring 53 swings downward the bearing frame 40, to thus carry the winding roll 42 into operative relation to the mandrel 35, and so that the section of paper is gripped therebetween. As will be understood from the above description, the mandrel is continuously rotated in one direction, and the winding roll 42 is likewise continuously rotated in the opposite direction; consequently the section of paper is gripped between the two and fed forward, being guided by engagement with the paper guide member 43, so that the paper is wound upon the mandrel 35 into a tubular form. It may be here pointed out that in severing the paper section from the main supply or web thereof, the knife 58 makes a bias or diagonal cut, so that the interior end of the paper section, when the same is wound into tubular form on the mandrel, will hug the interior cylindrical surface of the wrapper thus formed, without tending to spring away from such surface, and thus not interrupting the smooth cylindrical interior surface desired in the finished wrapper.

When the section of paper is thus wound around the mandrel 35, the outward end portion thereof will freely project slightly beyond the yieldable head disk 81 at the free end of the mandrel 35, as shown in Figure 11 of the drawings.

After the section of paper is completely wound upon the mandrel, the means for crimping one end of the tubular paper body thus formed is timed to perform its function.

Normally the cam element 90 holds the plunger 88 retracted within the barrel 86 against the tension of the compression spring 91, while the cam member 99 normally holds the bell-crank lever 97, with its T-head 102 engaged with the stud 101 to maintain the crimper-member 94 retracted within the socket-arm 92 against the tension of the compression spring 96. When said parts are in the above described normal initial positions, the crimper-finger 95 is removed or withdrawn from operative alinement with the tubular paper body wound on the mandrel 35, and also disposed outwardly offset from the free end of said tubular paper body. When, however, the winding of the paper on the mandrel 35 into the tubular body is completed, the cam member 99 reaches that point in its rotation, wherein the restraint exercised upon the bell-crank lever 97 is released, whereupon the compression spring 96 thrusts outwardly the crimper member 94 to aline the crimper finger 95 with the projecting end portion of the tubular paper body on the mandrel 35. After the crimper finger 95 is thus opposed to the tubular paper body on the mandrel 35, the cam element reaches that point of its rotation wherein the restraint exercised thereby upon the plunger 88 is gradually relaxed, so that the plunger 88 is impelled by the compression spring 91 in a direction which carries the crimper finger 95 into engagement with the projecting end portion of the tubular paper body on the mandrel 35. The said tubular paper body is rapidly rotated about its longitudinal axis by the rotating mandrel 35, so that as the crimper-finger 95 engages the projecting end-portion, the latter is curled or turned inwardly upon itself and against the yielding head-disk 81 to form a crimped end C in the manner indicated in Figures 12, 17 and 18 of the drawings. The head-disk 81 being under the outwardly thrusting tension of the spring 85, and thus yieldingly opposed to the action of the crimper-finger 95, assures a uniform, compact and firm inwardly turned or curled mass of paper to form the desired annular crimp C at one end of the tubular paper body, as will be understood from an inspection of Figure 12 of the drawings. The crimped end C, serves to both lock the tubular paper body from unwinding from the cylindrical shape to which it has been formed, as well as to provide an internal shoulder or stop against which the coins or other content to be enclosed in the wrapper W, thus provided, are engaged against displacement from the latter, while nevertheless being visible at one end of the package when thus enclosed.

After the crimper-finger 95 completes its operative crimping stroke relative to the tubular paper body, to thus complete the finished wrapper W, the cam element 90 operates to push back into the barrel 86 the plunger 88, thus retracting the crimper finger 95. Upon retraction of the crimper finger 95, the same is transversely withdrawn from alined relation to the formed wrapper W by the further action of the cam member 99, which thereupon rocks the bell-crank lever 97 to retract the crimper member 94 and its crimper finger 95 to normal initial position against the tension of the compression spring 96.

The tubular wrapper W, being completed by the above described operations, is ready to be removed from the mandrel 35, and thus ejected from the machine. To this end the cam element 70 is timed to produce, through the turning of the rock shaft 72, and the interconnected lever and link movement comprised in the parts 75, 79, 77, 78 and 69, a longitudinal forward movement of the ejector rod 68, which presses the head-disk 81 against the annular crimp C of the completed wrapper W, and by the said outward movement of the ejector-rod 68 moves the wrapper W longitudinally off of the free end of the mandrel 35, and into the embrace of spring retaining fingers F. The spring retaining fingers F, hold the wrapper while ejector-rod 68 is retracted to normal initial position.

The above described cycle of operations complete the wrapper W, and the continued running of the machine automatically and successively repeat the described cycle of operations, whereby said wrappers are automatically produced and discharged from the machine until the supply of paper is exhausted.

As each succeeding wrapper W is ejected from the mandrel 35 it strikes the preceding wrapper which is embraced by the retaining fingers F, and displaces the latter therefrom, so that the same drops into the basket or receptacle B, which is suitably placed adjacent to the discharge point of the machine to receive the completed wrappers.

I am aware that some changes may be made in the arrangements and combinations of the various devices and parts, as well as in the details of the construction of the same, without departing from the scope of my present invention as set forth in the foregoing specification, and as defined in the appended claims. Hence, I do not limit my invention to the exact arrangements and combinations of the several devices and parts as described in said foregoing specification, nor do I confine myself to the exact details of the construction of said parts as illustrated in the accompanying drawings.

I claim:—

1. In a machine for forming tubular paper wrappers, a rotary mandrel, a paper guide means substantially concentric to said mandrel, a winding roll to cooperate with said mandrel, means for rotating said winding roll, means for intermittently separating said winding roll from operative relation to said mandrel, timed means for delivering paper between said mandrel and winding roll while the latter is separated from the former, an ejector-member extending axially through and toward the free end of said mandrel, a yieldable head-disk carried by said ejector-member, said yieldable head-disk being outwardly offset from the free end of said mandrel and corresponding in diameter to the diameter of the latter, a crimping means for inwardly turning and crimping one end of the tubular paper body wound upon said mandrel, said yieldable head-disk cooperating with said crimping means and yielding to the operative action of the same, means for controlling the operative movements of said crimping means, means for withdrawing said crimping means out of operative alinement with the mandrel and tubular paper body thereon upon completion of the crimping operation, and means for actuating the ejector-member after withdrawal of said crimping means to remove the completed wrapper from said mandrel.

2. In a machine for forming tubular paper wrappers, a rotary mandrel upon which paper is wound to form a tubular body having a free end portion projecting beyond the free end of said mandrel, an ejector-member extending axially through said mandrel, a yieldable head-disk corresponding in diameter to the diameter of said mandrel carried by said ejector-member in outwardly off-set relation to the free end of said mandrel and within the projecting end portion of said tubular paper body, a crimping means for inwardly turning and crimping said projecting end portion of the tubular paper body, said yieldable head-disk cooperating with said crimping means and yielding to the operative action of the same, means for controlling the operative movements of said crimping means, means for withdrawing said crimping means out of operative alinement with the mandrel and tubular paper body thereon upon completion of the crimping operation, and means for actuating the ejector-member after withdrawal of said crimping means to remove the completed wrapper from said mandrel.

3. In a machine for forming tubular paper wrappers, a rotary mandrel upon which paper is wound to form a tubular body having a free end portion projecting beyond the free end of said mandrel, an ejector-member extending axially through said mandrel, a yieldable head-disk corresponding in diameter to the diameter of said mandrel carried by said ejector-member in outwardly off-set relation to the free end of said mandrel and within the projecting end portion of said tubular paper body, a spring impelled plunger in offset parallel relation to said mandrel, means for supporting said plunger, a socket-arm projecting transversely from said plunger toward the position of said mandrel, a spring pressed crimper member movable in said socket-arm, said crimper member having a crimping finger at its free end for operative alinement with the projecting end portion of said tubular paper body, a rotary cam element cooperating with said spring impelled plunger for timing and controlling the operative movements of said crimper member and its crimping finger, means for retracting said crimper member relative to said socket-arm to withdraw said crimping finger out of operative alinement with the mandrel and tubular paper body thereon upon completion of the crimping operation, and means for actuating the ejector-member after withdrawal of said crimper member to remove the completed wrapper from said mandrel.

4. In a machine for forming tubular paper wrappers, a rotary mandrel upon which paper is wound to form a tubular body having a free end portion projecting beyond the free end of said mandrel, an ejector-member extending axially through said mandrel, a yieldable head-disk corresponding in diameter to the diameter of said mandrel carried by said ejector-member in outwardly off-set relation to the free end of said mandrel and within the projecting end portion of said tubular paper body, a spring impelled plunger in offset parallel relation to said mandrel, means for supporting said plunger, a socket-arm projecting transversely from said plunger toward the position of said mandrel, a spring pressed crimper member movable in said socket-arm, said crimper member having a crimping finger at its free end for operative alinement with the projecting end portion of said tubular paper body, a rotary cam element cooperating with said spring impelled plunger for timing and controlling the operative movements of said crimper member and its crimping finger, means for retracting said crimper member relative to said socket-arm to withdraw said crimping finger out of operative alinement with the mandrel and tubular paper body thereon upon a completion of the crimping operation, said latter means comprising a bell-crank lever, a stud on said crimper member engageable by said bell-crank lever, and a rotary cam member for timing and controlling the movement of said bell-crank lever, and means for actuating the ejector member after withdrawal of said crimper member to remove the completed wrapper from said mandrel.

5. In a machine for forming tubular paper wrappers, a rotary mandrel, a concentrically spaced paper guide partially enclosing said mandrel, a winding roll to cooperate with said mandrel, means for rotating said winding roll, means for intermittently separating said winding roll from operative relation to said mandrel, a pair of paper feed rolls, a supporting table intermediate said mandrel and said paper feed rolls, said feed rolls being adapted to deliver the paper between said mandrel and winding roll while the latter is separated from the former, means for mounting a roll of paper subject to the withdrawing action of said feed rolls, a paper severing means associated with said supporting table, timed means for actuating said severing means to cut off a section of paper fed by said feed rolls into operative relation to said mandrel and winding means, means for inwardly turning and crimping one end of the paper wound on said mandrel to complete the wrapper, and means for ejecting the completed wrapper from the mandrel, said ejecting means having a yieldable head to cooperate with said crimping means.

6. In a machine for forming tubular paper wrappers, a rotary mandrel, a concentrically spaced paper guide partially inclosing said mandrel, a winding roll to cooperate with said mandrel, means for rotating said winding roll, means for intermittently separating said winding roll from operative relation to said mandrel, a pair of paper feed rolls, a supporting table intermediate said mandrel and said paper feed rolls, said feed rolls being adapted to deliver the paper between said mandrel and winding roll while the latter is separated from the former, means for mounting a roll of paper subject to the withdrawing action of said feed rolls, a paper severing means associated with said supporting table, timed means for actuating said severing means to cut off a section of paper fed by said feed rolls into operative relation to said mandrel and winding means, means for inwardly turning and crimping one end of the paper wound on said mandrel to complete the wrapper, means for withdrawing the crimping means out of operative alignment with the mandrel and paper wound thereon after completion of the crimping operation, and means for ejecting the completed wrapper from the mandrel, said ejecting means having a yieldable head to cooperate with said crimping means.

7. In a machine for forming tubular wrappers, a rotary mandrel, a concentrically spaced paper guide partially enclosing said mandrel, means for feeding paper to said mandrel, means cooperating with said mandrel to wind the paper thereon, means for inwardly turning and annularly crimping one end of the paper wound on said mandrel to complete the wrapper, devices to move said crimping means into and withdraw the same from its operating position, devices for timing and controlling the operative movements of said crimping means, means for ejecting the completed crimped wrapper from said mandrel, said ejecting means having a yieldable head to cooperate with said crimping means, and power transmission means adapted to operate said paper feeding means, crimping means positioning and controlling devices and ejecting means in suitably timed relation.

8. In a machine of the kind described, the combination with a rotary mandrel upon which paper is wound, of an ejector member extending axially through and toward the free end of said mandrel, a yieldable head-disk carried by said ejector member, a spring pressed crimping means for inwardly turning and annularly crimping one end of the paper wound on said mandrel, said yieldable head-disk cooperating with said crimping means and yielding to the operative action of the same, devices to move said crimping means into and withdraw the same from its operative position, and devices for timing and controlling the operative movements of said crimping means.

In testimony, that I claim the invention set forth above I have hereunto set my hand this 31st day of December, 1924.

EDWARD P. DONNELLAN.